(No Model.)　　　　　　　　　　　　　　　　　　　2 Sheets—Sheet 1.
H. C. CHESSMAN
MACHINE FOR PACKING CRACKERS.
No. 251,697.　　　　　　　　　　Patented Jan. 3, 1882.
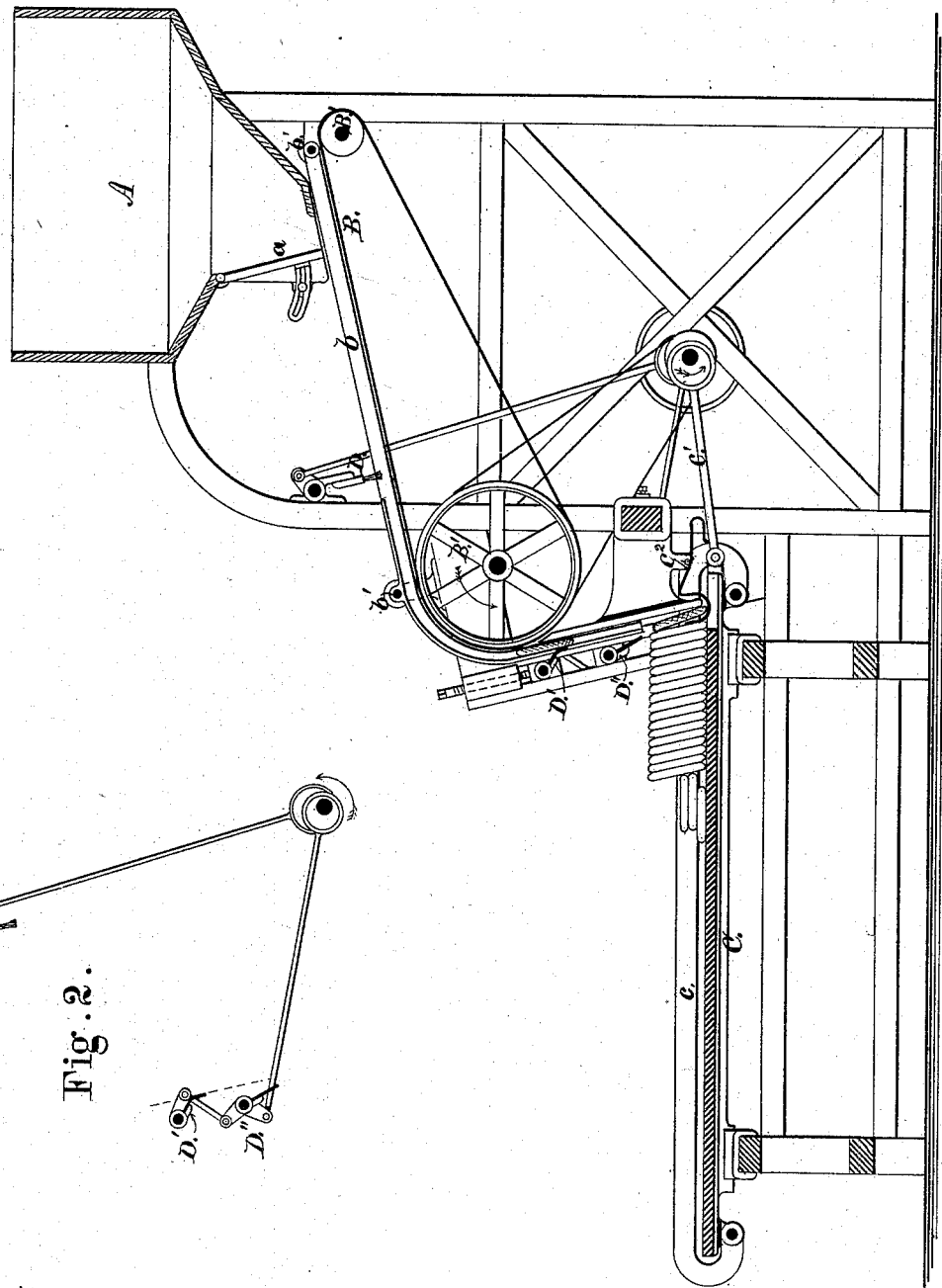
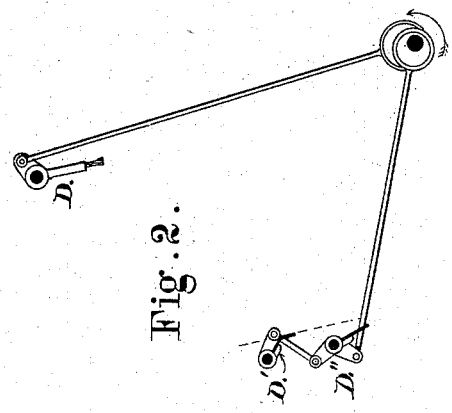
WITNESSES:　　　　　　　　　　INVENTOR:
J. A. Miller Jr　　　　　　　　　　Henry C Chessman
Wm. L. Cox　　　　　　　　　　by Joseph A Miller
　　　　　　　　　　　　　　　　　　atty
N. PETERS. Photo-Lithographer, Washington, D. C.

(No Model.) 2 Sheets—Sheet 2.

H. C. CHESSMAN.
MACHINE FOR PACKING CRACKERS.

No. 251,697. Patented Jan. 3, 1882.

WITNESSES:
J. A. Miller Jr
Wm L. Coop.

INVENTOR:
Henry C. Chessman
by Joseph A. Miller
atty

United States Patent Office.

HENRY C. CHESSMAN, OF PROVIDENCE, RHODE ISLAND.

MACHINE FOR PACKING CRACKERS.

SPECIFICATION forming part of Letters Patent No. 251,697, dated January 3, 1882.

Application filed March 9, 1881. (No model.)

*To all whom it may concern:*

Be it known that I, HENRY C. CHESSMAN, of the city and county of Providence, and State of Rhode Island, have invented a new and useful Improvement in Machines for Packing Crackers; and I hereby declare that the following is a full, clear, and exact description of the same, reference being had to the accompanying drawings, forming part of this specification.

My invention consists, in combination with a hopper, an endless apron, a chute or channel, and a reciprocating table, of partitions adapted to be adjusted laterally above the endless belt and reciprocating table.

It further consists in providing an oscillating brush or brushes to regulate the feed of the crackers.

It further consists in providing, in connection with the chute or channel and the reciprocating table, an adjustable stop.

In the manufacture of crackers and biscuits large quantities are packed into boxes and barrels. To pack them solidly they are usually set on their edges in rows side by side. To facilitate the packing of biscuits and crackers in this manner, it becomes necessary to range them in rows on their edges side by side, and to do this automatically by means of a machine is the object of this invention.

Figure 3:
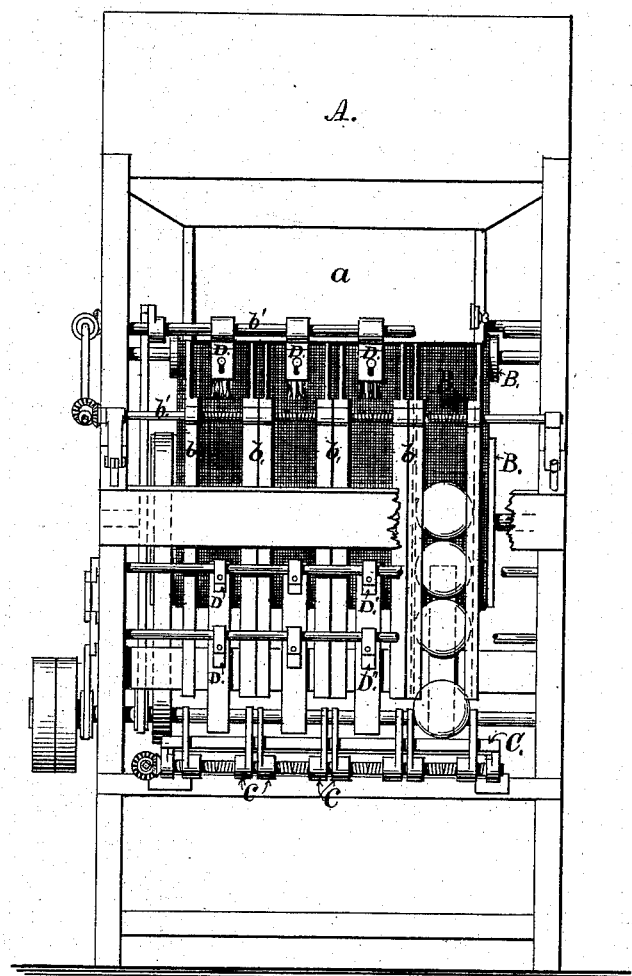
Figure 4:
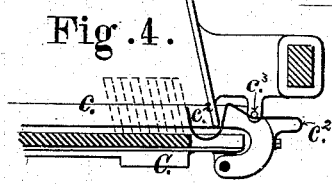
Figure 5:
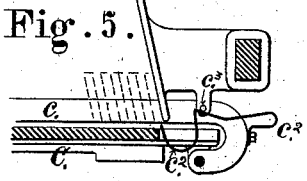

Figure 1 is a sectional view of my improved machine, showing the hopper into which the crackers are placed, the endless apron by which they are conveyed from the hopper, and the ways by which they are delivered side by side, ready for packing. Fig. 2 shows the connections of the brushes with the driving-shaft. Fig. 3 is an end view of the machine, shown partly in section. Fig. 4 is an enlarged view of the receiving end of the ways, showing the spring by which the crackers are kept off from the face of the plate, so as to allow the succeeding crackers to fall on the ways. Fig. 5 is a view of the same end of the ways, showing the same at the end of the reciprocation with the spring depressed.

In the drawings, A represents the hopper into which the crackers are placed. This hopper is provided with the hinged adjustable gate $a$, constructed to regulate the width of the opening to the size of the crackers to be packed.

B is the endless apron placed on the drums B' B'.

$b\ b$ are flanged partitions secured on the rods $b'\ b'$, so as to be adjustable to the width of the crackers. In Fig. 3 the three central sets are shown in pairs close together. This arrangement is used for large crackers, and if the machine is to be used for crackers somewhat smaller the flanged partitions $b\ b$ are, where they are in pairs, moved farther apart, so that when crackers of half the diameter of the crackers shown in the drawings are used the space between the flanged partitions $b\ b$ will form additional ways for these crackers, and in a machine of the size shown in the drawings seven ways will be formed for small crackers where only four are used for the larger size.

C is a reciprocating table divided into separate ways or channels by the division-rods $c$, which are also secured to rods, so as to be adjustable to the size of the crackers and so as to form continuous channels with the channels formed by the flanged partitions $b\ b$. The table C rests on slides, and is reciprocated by means of the rod $c'$, connecting with a crank or eccentric on the main driving-shaft, so that the crackers deposited on the table C are carried forward to allow other crackers to be deposited, and, when the table makes its return reciprocation, are pushed forward on the table.

To prevent the attendant, when he removes a portion of the crackers, from pushing the rest backward, an automatic stop is provided, which rises when the table C moves outward, and holds the crackers on the table in the proper place, and is depressed below the surface of the table when the table moves inward.

One method of operating the stop is shown in Figs. 1, 4, and 5, in which the spring $c^2$ is controlled by the pin $c^3$, so that when the table moves inward the forward end of the spring is depressed, and when the table moves outward the forward end rises and holds the crackers in the position required to allow the succeeding crackers to be deposited on the table.

The brush D, as also the brushes D' and D'', are oscillated by means of eccentrics placed on the driving-shaft, as is clearly shown in Fig. 2. Their function is to control the delivery of the crackers.

The operation of the machine is as follows: A quantity of crackers being placed into the hopper, the partitions $b$ and $c$ having been previously adjusted to the size of the crackers, the machine is started and crackers are carried forward into the channels until they reach the brush D, under which only one cracker can pass at a time. If there be two or more on top of each other, the brush D will sweep them back at each reciprocation, allowing only one at a time to pass. The brush D will also sweep the surface of each cracker and remove loose flour or dust. The crackers, having passed the brush D, are now carried by the endless apron over the periphery of the drum B', and are prevented from dropping down the vertical channels by the brush D', which is connected by bell-crank levers with the brush D'', so that in succession one after the other obstructs the channel. When, therefore, the crackers leave the brush D' they drop onto the brush $d''$, from which they are allowed to slide onto the table C, and as this table moves outward the crackers are carried outward and allow the succeeding crackers to fall behind the first, and when the table moves inward the crackers will be pushed forward as they rest against the bottom of the channels, and the table is drawn from under the crackers, when, on the outward reciprocation of the table, the space behind the crackers is filled with more crackers, and so on until the greater portion of the table is filled. The crackers can now be readily handled and set edgewise into boxes or barrels, greatly facilitating such packing and cleaning the crackers or biscuits from flour, dust, or loose particles.

Having thus described my invention, I claim as new and desire to secure by Letters Patent—

1. The combination, with the hopper A, of the endless apron B, the partitions $b$, the channels, the partitions $c$, devices for adjusting the partitions to adapt them for guiding crackers of different diameter, and the reciprocating table C, all combined to deliver the crackers on the table edgewise, as described.

2. The combination, with the hopper A, the endless apron B, and the reciprocating table C, of the brushes D, D', and D'', constructed as described, whereby the delivery of the crackers is regulated, as set forth.

3. The combination, with the hopper A, the endless apron B, reciprocating table C and the adjustable partitions $b$ and $c$ for dividing it into channels, of the adjustable stop $C^2$, constructed to rise and hold the crackers at the outward reciprocation of the table and to be depressed on the inward reciprocation, as described.

4. In a cracker-packing machine, the combination, with an endless apron on which the crackers are deposited, of the oscillating brush D, constructed to allow only one thickness of cracker to pass, and to sweep the same, as described.

5. In a machine constructed to deliver crackers edgewise, the combination, with vertical or inclined channels through which the crackers may fall by gravity, of two or more oscillating brushes, constructed to alternately hold and release the crackers, so as to allow them to fall any desired distance without injury, as described.

HENRY C. CHESSMAN.

Witnesses:
JOSEPH A. MILLER,
JOSEPH A. MILLER, Jr.